United States Patent
Jamloki et al.

(10) Patent No.: US 12,189,611 B2
(45) Date of Patent: Jan. 7, 2025

(54) ADDING LINEAGE DATA TO DATA ITEMS IN A DATA FABRIC

(71) Applicant: International Business Machines Corporation, Armonk, NY (US)

(72) Inventors: Shailesh Chandra Jamloki, Noida (IN); Kiran K Venkatachala, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/185,434

(22) Filed: Mar. 17, 2023

(65) Prior Publication Data
US 2024/0311364 A1    Sep. 19, 2024

(51) Int. Cl.
  G06F 7/00    (2006.01)
  G06F 16/23   (2019.01)

(52) U.S. Cl.
  CPC ................ G06F 16/2365 (2019.01)

(58) Field of Classification Search
  CPC .. G06F 16/2365; G06F 16/355; G06F 16/285; G06F 16/24564; G06F 16/51; G06F 16/5854; G06F 16/55; G06F 16/9535; G06F 16/58; G06Q 30/0631; G06Q 30/02; G06Q 30/0202; G06Q 30/06
  See application file for complete search history.

(56) References Cited

U.S. PATENT DOCUMENTS

| | | | |
|---|---|---|---|
| 10,540,363 B2 | 1/2020 | Schuster et al. | |
| 10,880,359 B2* | 12/2020 | Hadfield | H04L 67/02 |
| 11,397,744 B2 | 7/2022 | Wan et al. | |
| 2013/0127892 A1* | 5/2013 | Moore | G06T 11/001 |
| | | | 345/582 |
| 2021/0133843 A1* | 5/2021 | Jang | G06Q 30/0645 |
| 2021/0142110 A1* | 5/2021 | Tian | G06V 20/68 |
| 2022/0012363 A1 | 1/2022 | Colcord et al. | |
| 2022/0244935 A1* | 8/2022 | Johnson | G06F 8/65 |
| 2022/0319647 A1 | 10/2022 | Henderson, Jr. et al. | |
| 2023/0410182 A1* | 12/2023 | Phillips | G06Q 30/0631 |
| 2024/0111548 A1* | 4/2024 | Gu | B25J 9/1656 |

OTHER PUBLICATIONS

Liu et al., "M-Data-Fabric: A Data Fabric System Based on Metada," IEEE 5th International Conference on Big Data and Artificial Intelligence, 2022, pp. 57-62.

* cited by examiner

*Primary Examiner* — Mohammad A Sana
(74) *Attorney, Agent, or Firm* — CANTOR COLBURN LLP; Teddi Maranzano (57) ABSTRACT

Computer-implemented methods for adding lineage data to a data fabric are provided. Aspects include receiving a data item from a data source and obtaining a metadata fabric pattern corresponding to one or more of the data item and the data source. Aspects also include appending an identifier of the metadata fabric pattern to the data item and identifying one or more rules that correspond to the data item based on the identifier. Aspects further include performing one or more actions specified by the one or more rules and storing the data item in one or more data storage devices of the data fabric.

18 Claims, 6 Drawing Sheets

FIG. 6

ADDING LINEAGE DATA TO DATA ITEMS IN A DATA FABRIC

BACKGROUND

The present disclosure generally relates to data fabrics, and more specifically, to adding lineage data to data items in a data fabric.

A data fabric is a unified and integrated data management platform that enables seamless access and sharing of data across multiple systems, applications, and cloud environments. It is designed to create a single view of all data, regardless of its location, format, or structure. A data fabric is built on a combination of technologies, which work together to provide a comprehensive and unified view of data across the enterprise.

In general, a data fabric includes multiple data storage devices that store data received from data sources and provide data to data consumers. Data fabrics traditionally use data replication systems to ensure that all of the data stored and accessed is coherent. However, often when data items are input into the data fabric, metadata regarding the data item are not captured from the source of the data item. In addition, when a data item is replicated (i.e., a data item is copied from one storage location to another), metadata corresponding to the data item is not replicated.

As a result of the failure to capture and replicate the metadata regarding data items in the data fabric, the stored data often lacks contextual information that is beneficial to the understanding of the data item.

SUMMARY

Embodiments of the present disclosure are directed to computer-implemented methods for providing physical data security in a low earth orbit data center. According to an aspect, a computer-implemented method includes receiving a data item from a data source and obtaining a metadata fabric pattern corresponding to one or more of the data item and the data source. The method also includes appending an identifier of the metadata fabric pattern to the data item and identifying one or more rules that correspond to the data item based on the identifier. The method further includes performing one or more actions specified by the one or more rules and storing the data item in one or more data storage devices of the data fabric.

Embodiments of the present disclosure are directed to a computing system having a memory having computer readable instructions and one or more processors for executing the computer readable instructions. The computer readable instructions controlling the one or more processors to perform operations that include receiving a data item from a data source and obtaining a metadata fabric pattern corresponding to one or more of the data item and the data source. The operations also include appending an identifier of the metadata fabric pattern to the data item and identifying one or more rules that correspond to the data item based on the identifier. The operations further include performing one or more actions specified by the one or more rules and storing the data item in one or more data storage devices of the data fabric.

Embodiments of the present disclosure are directed to a computer program product having a computer readable storage medium having program instructions embodied therewith. The program instructions executable by a processor to cause the processor to perform operations that include receiving a data item from a data source and obtaining a metadata fabric pattern corresponding to one or more of the data item and the data source. The operations also include appending an identifier of the metadata fabric pattern to the data item and identifying one or more rules that correspond to the data item based on the identifier. The operations further include performing one or more actions specified by the one or more rules and storing the data item in one or more data storage devices of the data fabric.

In one embodiment, the one or more rules include a metadata collection rule that identifies a metadata of the data item to be captured from the data source and the one or more actions include capturing the metadata for the data item. The captured metadata is transmitted and stored with the data item in the one or more data storage devices. As a result, the data fabric is able to collect and store the relevant contextual data that can be used for additional insights regarding the data item.

In one embodiment, the one or more rules include a data protection rule that identifies conditions that require obfuscation of the data item, and wherein the one or more actions include obfuscating the data item based on the conditions being met.

In one embodiment, the one or more rules include a data storage rule that identifies a type of storage device that the data item is permitted to be stored on, and wherein the one or more actions include preventing the data item from being stored on of the one or more data storage devices that are not the type of storage device.

In one embodiment, the one or more rules include a data consistency rule that identifies existing data stored in the data fabric that the data item is to be validated against, and wherein the one or more actions include ensuring that the data item is within a threshold of the existing data stored.

In one embodiment, the one or more rules include a data coherency rule that identifies one of a defined range and a defined format for the data item, and wherein the one or more actions include ensuring that the data item is within the defined range and has the defined format.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

In most cases, every data item that is stored in a data fabric has associated metadata that has business significance or meaning that know to and/or available from the source of the data item. As discussed above, when a data item is replicated (i.e., a data item is copied from one storage location to another), metadata corresponding to the data item is not replicated. As a result, potentially significant metadata regarding the data item and the source of the data item may be lost.

In exemplary embodiments, methods, systems, and computer program products are provided which add lineage data to data items stored in a data fabric. In exemplary embodiments, users create a metadata fabric pattern that includes a set of rules that specify metadata to be collected and stored with data items in the data fabric. The metadata fabric pattern also includes rules that control data replication, data storage, data obfuscation, data consistency, and data coherency in the data fabric. In exemplary embodiments, the metadata fabric pattern is represented by a data identifier that is stored along with the data item in the data fabric. Each time the data items are accessed, transmitted, and/or stored in the data fabric, the metadata fabric pattern is used to control the usage of the data item.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
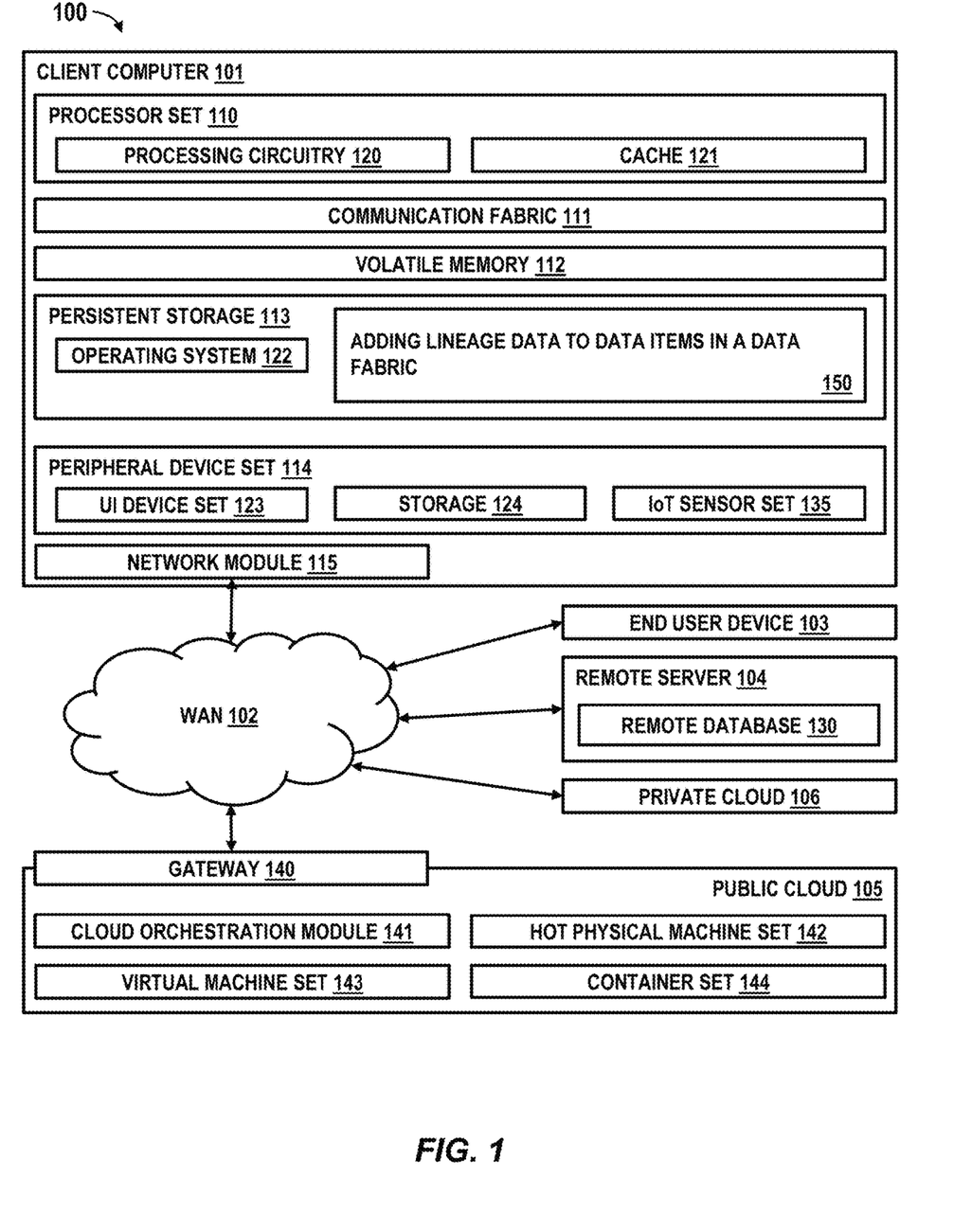
FIG. 1 depicts a block diagram of an example computer system for use in conjunction with one or more embodiments of the present disclosure.

Computing environment 100 contains an example of an environment for the execution of at least some of the computer code involved in performing the inventive methods, such as adding lineage data to data items in a data fabric 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
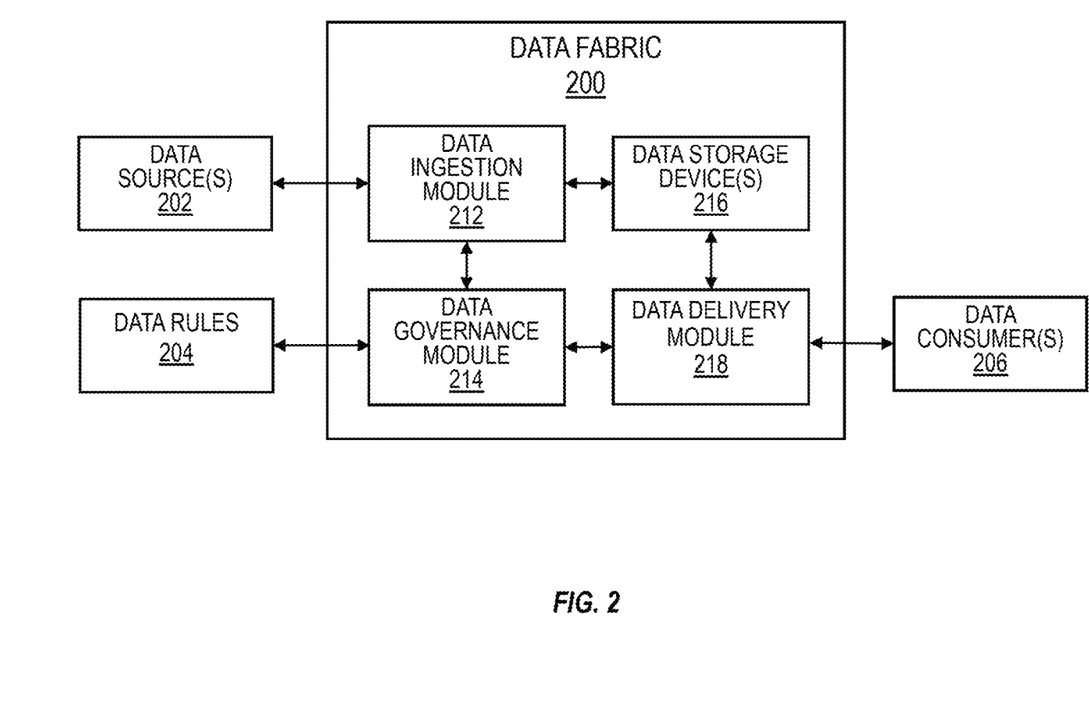
FIG. 2 depicts a block diagram of components of a data fabric in accordance with one or more embodiments of the present disclosure.

Referring now to FIG. 2 a block diagram of a data fabric 200 in accordance with one or more embodiments of the present disclosure is shown. In one embodiment, the data fabric 200 may include a computing environment 100, such as the one shown in FIG. 1. In exemplary embodiments, the data fabric 200 includes a plurality of data storage devices 216 that are configured to store data items. The data storage devices 216 can include both public cloud storage elements and private cloud storage elements. The data fabric 200 also includes a data governance module 214 that is configured to receive one or more rules for the processing, transmission and storage of data items in the data fabric 200. In exemplary embodiments, the data rules 204 are received from a user (not shown) and used to create a data fabric pattern.

The data fabric 200 also includes a data delivery module 218 that is configured to receive a request for a data item stored in one or more data storage devices 216 from a data consumer 206. In exemplary embodiments, the data delivery module 218 obtains metadata regarding the data consumers 206, such as the security level of the data consumer 206, the organizational role of the data consumer 206, the location of the data consumer 206, and the like. The data delivery module 218 is configured to obtain the requested data item from the data storage devices 216 and to provide the data item to the data consumer 206 in compliance with the data fabric pattern associated with the data item.

The data fabric 200 includes a data ingestion module 212 that is configured to receive data items to be stored in the data fabric 200 from one or more data sources 202. In exemplary embodiments, upon receiving a data item from a data source 202, the data ingestion module 212 obtains the data fabric pattern that corresponds to one or the data item or to the data source 202. The data ingestion module 212 appends an identifier of the data fabric pattern to the received data item. In exemplary embodiments, the appended identifier for the data fabric pattern is a single byte of data that is appended to the data item. In exemplary embodiments, the appended identifier for the data fabric pattern is utilized to identify the rules for the processing of the data item each time the data item is transmitted or accessed in the data fabric 200.

In exemplary embodiments, the data fabric pattern includes a plurality of rules that include, but are not limited to, metadata collection rules, data protection rules, a data storage rules, data consistency rules, a data coherency rules, and the like. In exemplary embodiments, the metadata collection rules instruct the data ingestion module 212 to obtain metadata from the data source 202 that corresponds to the received data item. Based on the metadata collection rule the data ingestion module 212 obtains the identified metadata for the data item and stores the metadata along with the data item in one or more of the data storage devices 216.

In exemplary embodiments, the data protection rules identify one or more conditions that require obfuscation of the data item. In one embodiment, the data protection rules may identify that the data item must be partially obfuscated when being transmitted to a particular data consumer 206. For example, the data item may be an address of a person and the data protection rule will allow the full address to be provided to one type of data consumers (such as a person in a billing department) but will require that the data item be at least partially obfuscated when proved to another type of data consumer (such as a person in a marketing department). In this example, the data obfuscation can include only providing the zip code or city and state of the data item to users outside of the billing department.

In exemplary embodiments, the data storage rules identify a type of storage device that the data item is permitted to be stored on. In one embodiment, the data storage devices 216 include a plurality of storage devices of different types, where the types of the storage devices correspond to a security level of the storage devices (i.e., is the storage device public or private, encrypted or not encrypted, and the like). In exemplary embodiments, the data injection module 212 is configured to prevent a data item from being stored on one or more data storage devices that are not the type of storage device specified by the data storage rules.

In exemplary embodiments, the data consistency rules identify existing data stored in the data fabric that newly received data items are validated against. In one embodiment, the data injection module 212 is configured to apply the data consistency rules by comparing a newly received data item against the identified existing data in the data fabric. In one embodiment, the data consistency rules also include an evaluation criterion (such as the newly received data within a threshold of a mean value of the existing data) and instructions for handling new data items that fail to meet the evaluation criteria. In exemplary embodiments, the instructions can include storing the newly received data item in a different location in the data fabric, creating an alert of the failed evaluation criteria, discarding the newly received data item, or the like.

In exemplary embodiments, the data coherency rules include a specific evaluation criterion for newly received data items. In one embodiment, the data injection module 212 is configured to apply the data coherency rules by validating the data item against the specific evaluation criterion. The specific evaluation criterion can include one of a defined range and a defined format for the data item. In exemplary embodiments, the data coherency rules also include instructions for handling new data items that fail to meet the specific evaluation criterion. The instructions can include storing the newly received data item in a different location in the data fabric, creating an alert of the failed evaluation criteria, discarding the newly received data item, or the like.

Figure 3:
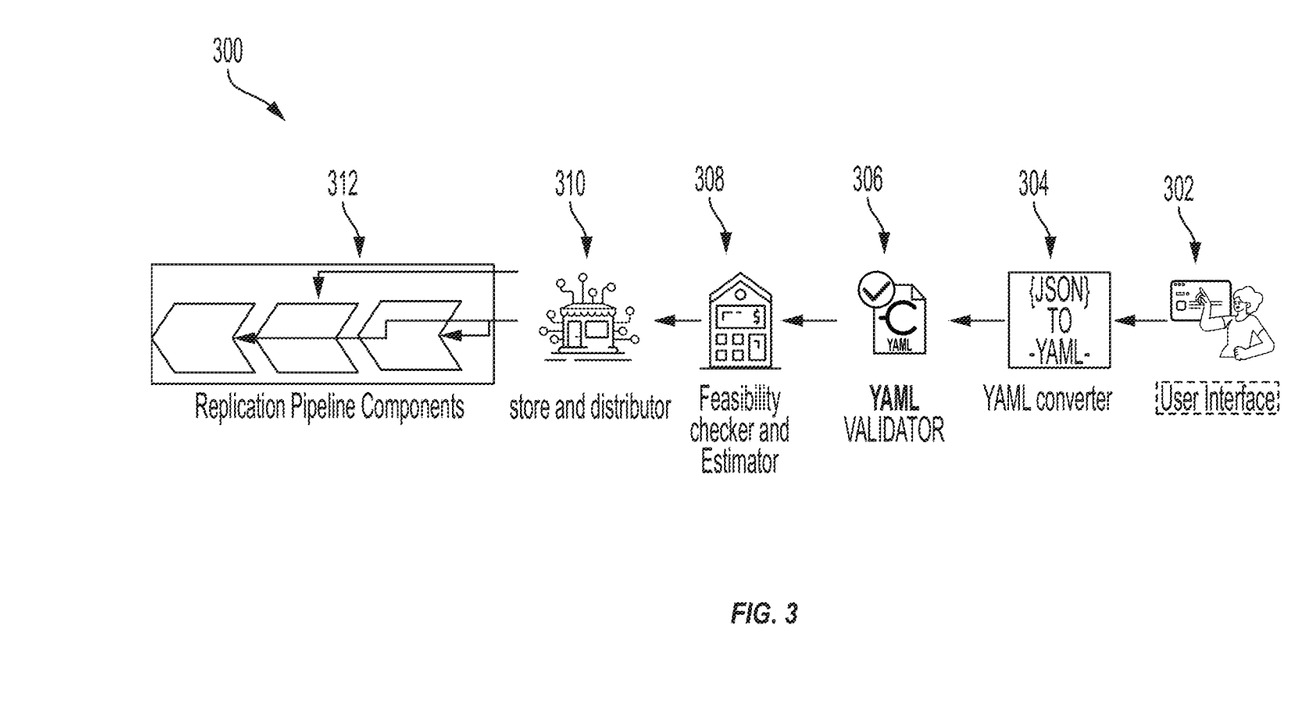
FIG. 3 depicts a schematic illustration of a process for creating a metadata fabric pattern in accordance with one or more embodiments of the present disclosure.

Referring now to FIG. 3, a schematic illustration of a process 300 for creating a metadata fabric pattern in accordance with one or more embodiments of the present disclosure is shown. As illustrated, a user interface 302 is utilized by a user to create one or more rules regarding the capturing of metadata, the storage, and the transmission of data in a data fabric. In one embodiment, the user interface 302 is configured to create a JavaScript Object Notation (JSON) file that includes the rules specified by the user. Next, a converter 304 is configured to convert the JSON file to a Yet Another Markup Language (YAML) file that includes the rules. The YAML file is then analyzed by a validator 306 and feasibility check 308. In exemplary embodiments, the validator 306 is configured to validate the user intention of the rules that is being given as an input and it returns true if it can be translated to a valid rule. In exemplary embodiments, the feasibility check 308 is configured to determine that valid rules are feasible to execute and implement. In other words, the rule described by user can fit in the replication system as it is and can achieve results in a way user intends to. Next, once the YAML file has been validated and inspected, it is distributed and stored, by a data governance module 310, as a data fabric pattern in the data fabric. The data fabric pattern in the data fabric is then applied and utilized by the data fabric 312, including the data injection module, the data storage devices and data delivery modules, to control the usage of the data item in the data fabric 312.

Figure 4:
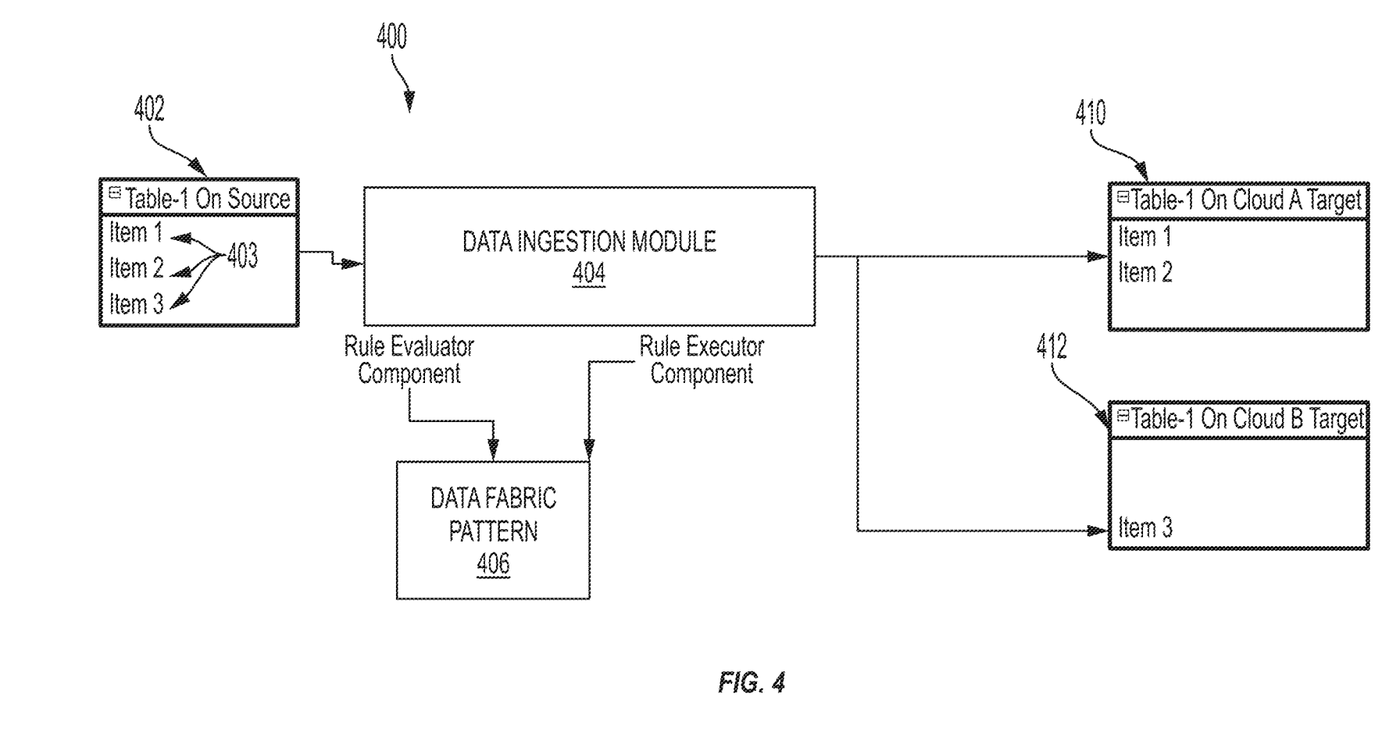
FIG. 4 depicts a schematic illustration of a process for storing a data item having a metadata fabric pattern in a data fabric in accordance with one or more embodiments of the present disclosure.

Referring now to FIG. 4, a schematic illustration of a process 400 for storing a data item having a metadata fabric pattern in a data fabric in accordance with one or more embodiments of the present disclosure is shown. As illustrated, a data injection module 404 of a data fabric receives updates to a data source 402, (i.e., a table stored in the data fabric is updated by a user). Based on the data source 402 and or updated data items 403, the data injection module 404 obtains a data fabric pattern 406, which contains rules regarding the storage of the updated data items 403. In the illustrated embodiment, the data fabric pattern 406 includes storage rules that instruct the data ingestion module 404 to store one of the updated data items to a table 412 stored in a separate cloud (Cloud B) environment from table 410, which is stored on Cloud A. For example, Cloud B may be a private cloud, Cloud A may be a public cloud, and data item 3 403 may be sensitive data that is restricted to be stored only on the private cloud.

Figure 5:
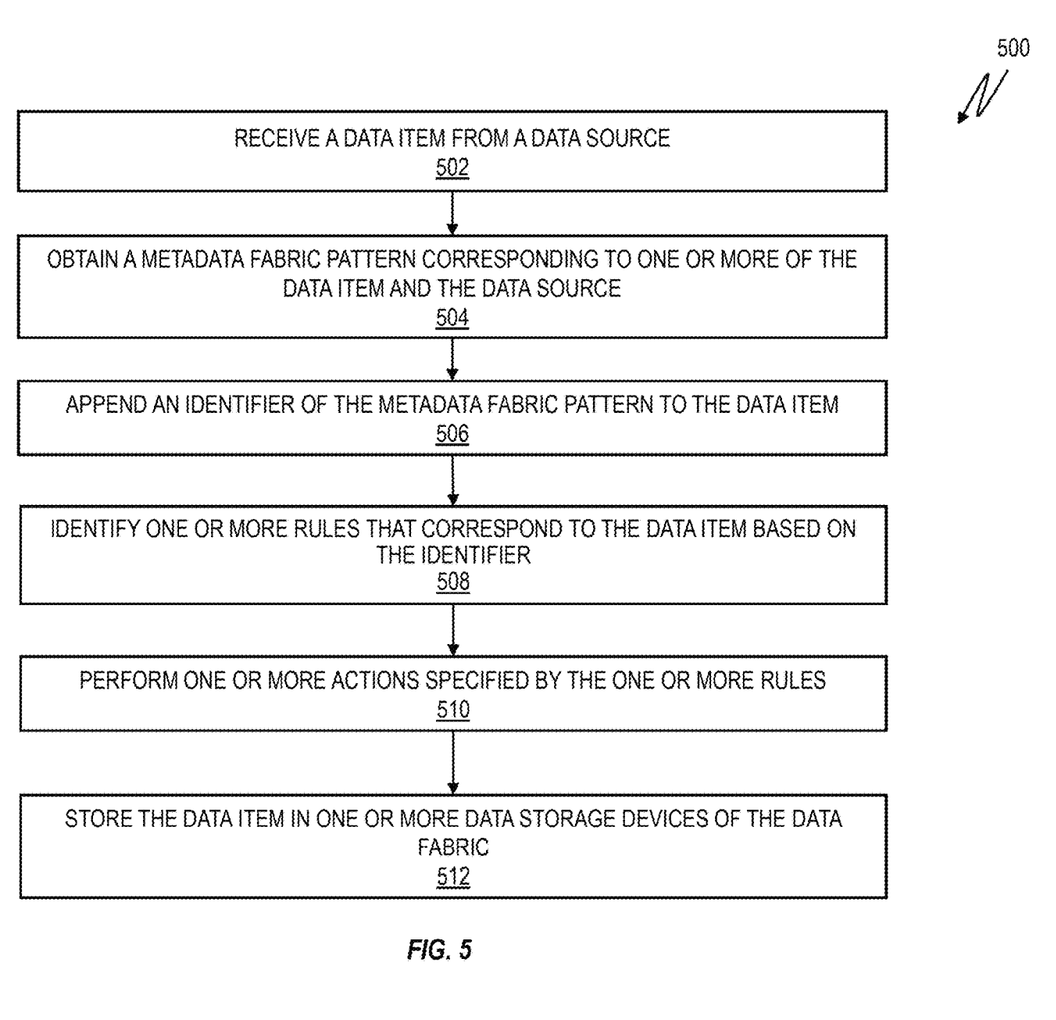
FIG. 5 is a flowchart of a method for adding lineage data to a data item received by a data fabric in accordance with one or more embodiments of the present disclosure.

Referring now to FIG. 5, a flowchart 500 of a method for adding lineage data to a data item received by a data fabric in accordance with one or more embodiments of the present disclosure is shown. As shown at block 502, the method 500 begins by receiving a data item from a data source. In exemplary embodiments, the data item is received by a user updating a table of data stored in a data fabric. Next, as shown at block 504, the method 500 includes obtaining a metadata fabric pattern corresponding to one or more of the data items and the data source. In exemplary embodiments, the metadata fabric pattern is created by converting a JavaScript Object Notation (JSON) provided by a user into a Yet Another Markup Language (YAML) file. The metadata fabric pattern includes a set of rules that govern the collection, transmission, and storage of data items in the data fabric.

At block 506, the method 500 includes appending an identifier of the metadata fabric pattern to the data item. In exemplary embodiments, the identifier is stored and transmitted with the data item and is used by the equipment in the data fabric to identify the data fabric pattern to apply to the usage of the data item. In one embodiment, the identifier is a one-byte field that is appended to the data item. Next, as shown at block 508, the method 500 includes identifying one or more rules that correspond to the data item based on the identifier. The one or more rules include one or more of metadata collection rules, data protection rules, a data storage rules, data consistency rules, a data coherency rules, and the like. The method 500 also include performing one or more actions specified by the one or more rules, as shown at block 510. The method 500 concludes at block 512 by storing the data item in one or more data storage devices of the data fabric.

In one embodiment, the one or more rules include a metadata collection rule that identifies a metadata of the data item to be captured from the data source, and wherein the one or more actions include capturing the metadata for the data item. The captured metadata is transmitted and stored with the data item in the one or more data storage devices. In another embodiment, the one or more rules include a data protection rule that identifies conditions that require obfuscation of the data item, and wherein the one or more actions include obfuscating the data item based on the conditions being met. In one embodiment, the one or more rules include a data storage rule that identifies a type of storage device that the data item is permitted to be stored on, and wherein the one or more actions include preventing the data item from being stored on of the one or more data storage devices that are not the type of storage device. In another embodiment, the one or more rules include a data consistency rule that identifies existing data stored in the data fabric that the data item is to be validated against, and wherein the one or more actions include ensuring that the data item is within a threshold of the existing data stored. In a further embodiment, the one or more rules include a data coherency rule that identifies one of a defined range and a defined format for the data item, and wherein the one or more actions include ensuring that the data item is within the defined range and has the defined format.

Figure 6:
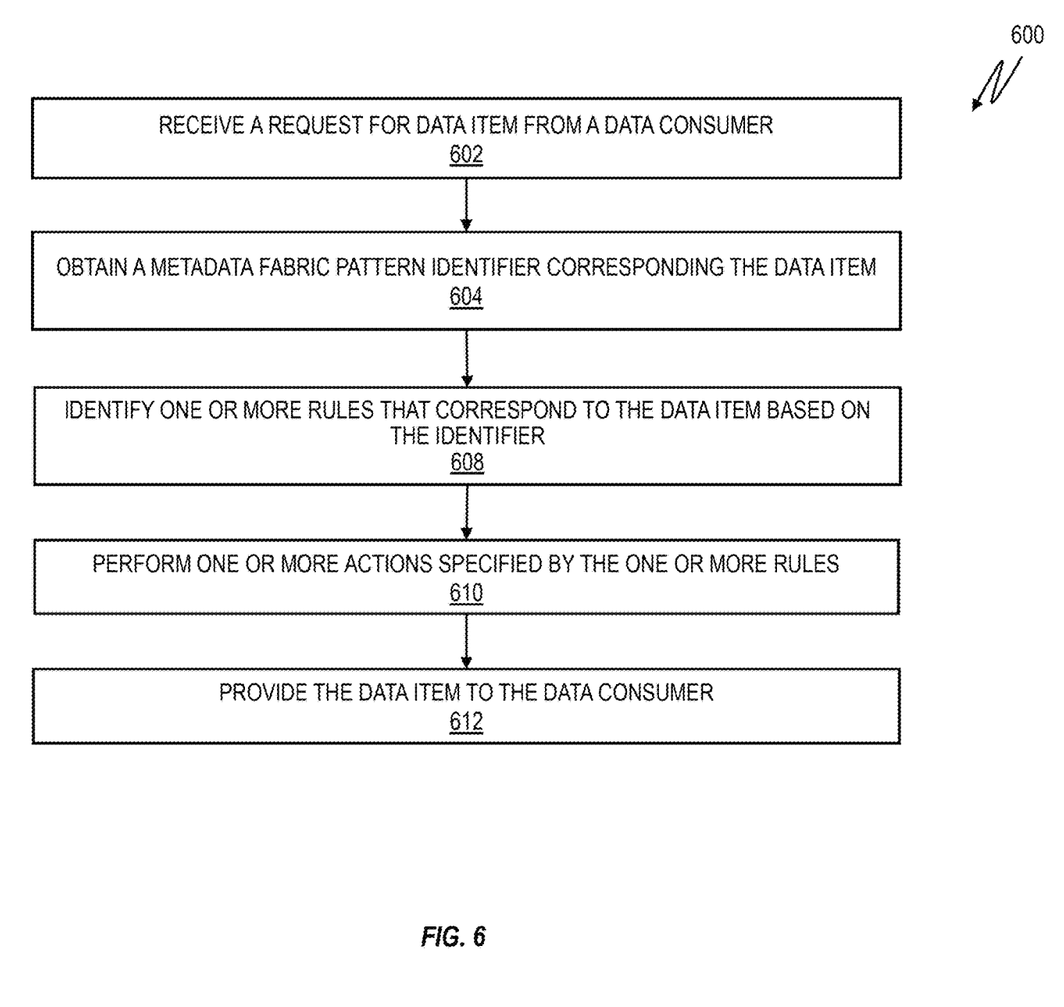
FIG. 6 is a flowchart of a method for accessing a data item having a metadata fabric pattern in a data fabric in accordance with one or more embodiments of the present disclosure.

Referring now to FIG. 6, a flowchart 600 of a method for accessing a data item having a metadata fabric pattern in a data fabric in accordance with one or more embodiments of the present disclosure is shown. The method 600 begins at block 602 by receiving a request for data item from a data consumer. Next, at block 604, the method 600 includes obtaining a metadata fabric pattern identifier corresponding the data item. Once the metadata fabric pattern is obtained, the method 600 includes identifying one or more rules that correspond to the data item based on the identifier, as shown at block 608. The one or more rules may also be identified based at least in part on the data consumer. Next, at block 610, the method 600 includes perform one or more actions specified by the one or more rules. The method 600 concludes at block 612 by providing the requested data item to the data consumer.

In one embodiment, an organization has decided to store all of its data in a data fabric, which includes various repositories for various purposes, such as a marketing database for marketing purposes, a data warehouse on the public cloud for analytics and in application database on private cloud for application usage. The organization may create a data fabric pattern to ensure that as data is replicated across the data fabric some of the fields or columns should be masked based on the data consumer. For example, when sharing customer data with an analytics team, a customer's phone number should be masked and when sharing with the marketing team customer's history or family details should be masked. In exemplary embodiments, the data fabric pattern can be used to clean the data intelligently and make it available to data science with minimal cleanup. For example, for a particular column having an average value of six and a new value is received that has a value of 100, the data fabric pattern can flag the new data point as an outlier during replication.

In exemplary embodiments, user can only record their business metadata and pattern design steps only when replication of data in the data fabric is stopped. These rules will be available to all the replication pipeline components all time. If there are any data that replication pipeline component needs to evaluate business logic it can be derived from previous received data, or be calculated based on previous received data.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for adding lineage data to a data fabric, the method
   receiving a data item from a data source;
   obtaining a metadata fabric pattern corresponding to one or more of the data item and the data source;
   appending an identifier of the metadata fabric pattern to the data item;
   identifying one or more rules that correspond to the data item based on the identifier;
   performing one or more actions specified by the one or more rules; and
   storing the data item in one or more data storage devices of the data fabric,
   wherein the one or more rules include a data coherency rule that identifies one of a defined range and a defined format for the data item, and wherein the one or more actions include ensuring that the data item is within the defined range and has the defined format.

2. The method of claim 1, wherein the one or more rules include a metadata collection rule that identifies a metadata of the data item to be captured from the data source, and wherein the one or more actions include capturing the metadata for the data item.

3. The method of claim 2, wherein the metadata is transmitted and stored with the data item in the one or more data storage devices.

4. The method of claim 1, wherein the metadata fabric pattern is created by converting a JavaScript Object Notation (JSON) provided by a user into a Yet Another Markup Language (YAML) file.

5. The method of claim 1, wherein the one or more rules include a data protection rule that identifies conditions that require obfuscation of the data item, and wherein the one or more actions include obfuscating the data item based on the conditions being met.

6. The method of claim 1, wherein the one or more rules include a data storage rule that identifies a type of storage device that the data item is permitted to be stored on, and wherein the one or more actions include preventing the data item from being stored on of the one or more data storage devices that are not the type of storage device.

7. The method of claim 1, wherein the one or more rules include a data consistency rule that identifies existing data stored in the data fabric that the data item is to be validated against, and wherein the one or more actions include ensuring that the data item is within a threshold of the existing data stored.

8. The method of claim 1, wherein the identifying the one or more rules and the performing the one or more actions are performed each time the data item is transmitted or accessed.

9. A computing system having a memory having computer readable instructions and one or more processors for executing the computer readable instructions, the computer readable instructions controlling the one or more processors to perform operations comprising:
receiving a data item from a data source;
obtaining a metadata fabric pattern corresponding to one or more of the data item and the data source;
appending an identifier of the metadata fabric pattern to the data item;
identifying one or more rules that correspond to the data item based on the identifier;
performing one or more actions specified by the one or more rules; and
storing the data item in one or more data storage devices of the data fabric,
wherein the one or more rules include a data coherency rule that identifies one of a defined range and a defined format for the data item, and wherein the one or more actions include ensuring that the data item is within the defined range and has the defined format.

10. The computing system of claim 9, wherein the one or more rules include a metadata collection rule that identifies a metadata of the data item to be captured from the data source, and wherein the one or more actions include capturing the metadata for the data item.

11. The computing system of claim 10, wherein the metadata is transmitted and stored with the data item in the one or more data storage devices.

12. The computing system of claim 9, wherein the metadata fabric pattern is created by converting a JavaScript Object Notation (JSON) provided by a user into a Yet Another Markup Language (YAML) file.

13. The computing system of claim 9, wherein the one or more rules include a data protection rule that identifies conditions that require obfuscation of the data item, and wherein the one or more actions include obfuscating the data item based on the conditions being met.

14. The computing system of claim 9, wherein the one or more rules include a data storage rule that identifies a type of storage device that the data item is permitted to be stored on, and wherein the one or more actions include preventing the data item from being stored on of the one or more data storage devices that are not the type of storage device.

15. The computing system of claim 9, wherein the one or more rules include a data consistency rule that identifies existing data stored in the data fabric that the data item is to be validated against, and wherein the one or more actions include ensuring that the data item is within a threshold of the existing data stored.

16. The computing system of claim 9, wherein the identifying the one or more rules and the performing the one or more actions are performed each time the data item is transmitted or accessed.

17. A computer program product comprising a non-transitory computer readable storage medium having program instructions embodied therewith, the program instructions executable by a processor to cause the processor to perform operations comprising: receiving a data item from a data source; obtaining a metadata fabric pattern corresponding to one or more of the data item and the data source; appending an identifier of the metadata fabric pattern to the data item; identifying one or more rules that correspond to the data item based on the identifier; performing one or more actions specified by the one or more rules; and storing the data item in one or more data storage devices of the data fabric, wherein the one or more rules include a data coherency rule that identifies one of a defined range and a defined format for the data item, and wherein the one or more actions include ensuring that the data item is within the defined range and has the defined format.

18. The computer program product of claim 17, wherein the one or more rules include a metadata collection rule that identifies a metadata of the data item to be captured from the data source, and wherein the one or more actions include capturing the metadata for the data item.

\* \* \* \* \*